United States Patent [19]
Barry

[11] 4,147,411
[45] Apr. 3, 1979

[54] DEVICE FOR USE IN THREADING NEEDLES

[76] Inventor: Robert L. Barry, 416 Giovanni Dr., Nokomis, Fla. 33555

[21] Appl. No.: 860,064

[22] Filed: Dec. 13, 1977

[51] Int. Cl.$^2$ .......................... G02B 7/04; G02B 27/02
[52] U.S. Cl. ...................................... 350/240; 350/243
[58] Field of Search ............................... 350/235–253, 350/255–257

[56] References Cited

U.S. PATENT DOCUMENTS

| | | | |
|---|---|---|---|
| 1,241,427 | 9/1917 | Nielsen | 350/244 |
| 1,568,148 | 1/1926 | Fiske | 350/240 |
| 1,669,870 | 5/1928 | Fiske | 350/241 |
| 1,707,351 | 4/1929 | Fiske | 350/255 |

FOREIGN PATENT DOCUMENTS 665778  1/1952  United Kingdom ..................... 350/243

Primary Examiner—John K. Corbin
Assistant Examiner—Wm. H. Punter
Attorney, Agent, or Firm—John N. Randolph

[57] ABSTRACT

A device to assist in threading needles includes a holder which is manually supported and which provides a support for a magnifying glass. A needle is detachably mounted in the holder with the eye exposed. The device includes means for varying the spacing between the magnifying glass and needle eye to locate the needle eye at the correct focal length of the magnifying glass for the particular user.

5 Claims, 4 Drawing Figures

DEVICE FOR USE IN THREADING NEEDLES

SUMMARY

It is a primary object of the present invention to provide an extremely simple device capable of effectively functioning to assist the user in threading needles, which includes a needle holder, a magnifying glass and means for varying the spacing between the magnifying glass and the eye of the needle to locate the needle eye at the correct focal point of the magnifying glass for the particular user.

Another object of the invention is to provide a device which will greatly assist and enable elderly persons and others with defective vision to thread needles, frequently without the use of eyeglasses.

Various other objects and advantages of the invention will hereinafter become more fully apparent from the following description of the drawing, illustrating presently preferred embodiments thereof, and wherein;

DESCRIPTION OF THE PREFERRED EMBODIMENTS

Figure 1:
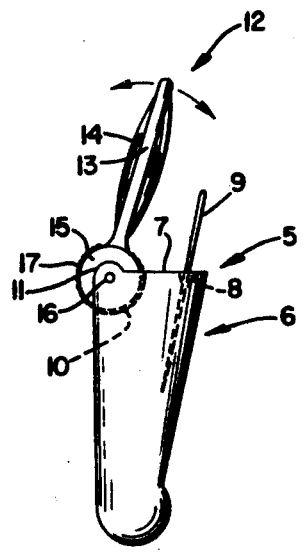
FIG. 1 is a side elevational view of a preferred embodiment of the device for use in threading needles.
Figure 2:
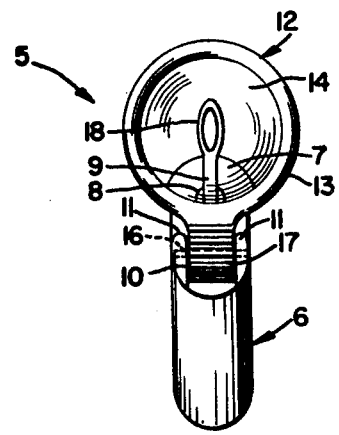
FIG. 2 is a front elevetional view thereof, looking from left to right of FIG. 1.

Referring more specifically to the drawing and first with reference to FIGS. 1 and 2, the device for use in threading needles in its entirety is designated generally 5 and includes a holder 6 which is rounded in shape to form a handle and which has an upper end 7. An elongated socket 8 has a flared upper end which opens through the upper end surface 7 to detachably receive the pointed end and a substantial part of a conventional sewing needle 9. Said upper end 7 is provided with an arcuate recess 10 forming corresponding spaced ears 11.

A magnifying glass 12 includes a frame 13 in which is mounted a magnifying lens 14. The frame 13 has a disclike extension 15 projecting from a part thereof, which fits between the ears 11 and which is pivotally connected thereto by a pin 16 which extends through said ears and centrally through the member 15. The periphery of the member 15 is provided with teeth or serrations 17 which frictionally contact the surface 10 as the magnifying glass 12 is swung toward or away from the needle eye 18 about the pin 16, for varying the space between the lens 14 and the eye 18, which is disposed to face said lens, as seen in FIG. 2. Thus, the toothed surface 17 cooperates with the surface 10 to retain the magnifying glass 12 at the correct focal length from the eye 18 to accommodate the eye of the particular user, to enable him or her to most easily thread the needle 9.

Figure 3:
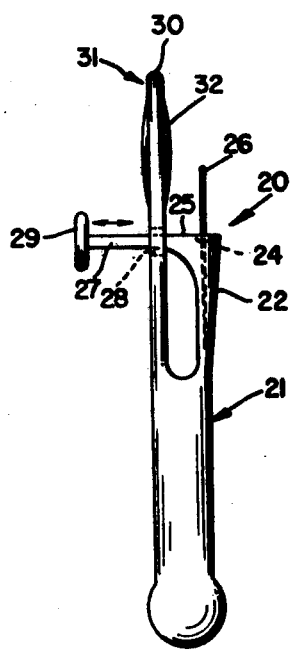
FIG. 3 is a view similar to FIG. 1 of another embodiment of the device.
Figure 4:
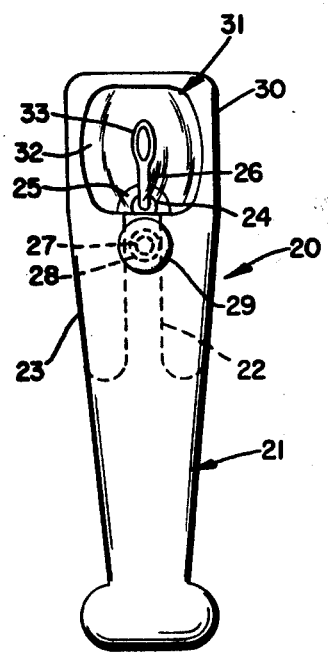
FIG. 4 is a view similar to FIG. 2 of the device of FIG. 3.

FIGS. 3 and 4 illustrate another embodiment of the device for use in threading needles, designated generally 20, and which includes a holder 21 forming a handle. The handle 21 has a bifurcated upper portion including furcations 22 and 23. Furcation 22 has a deep recess 24 which is flared at its upper end which opens through an upper surface 25 thereof and which recess accommodates a conventional sewing needle 26. The upper portion of the furcation 22 has a lateral extension 27 which extends through an opening 28 of the furcation 23, and which is provided with a thumb rest 29 on its terminal, which is spaced from the furcation 23. The upper portion of the furcation 23 forms a frame 30 of a magnifying glass 31 in which is mounted a lens 32.

As seen in FIG. 4, the eye 33 of the needle 26 is positioned to face the lens 32. The lower portion of the holder 21, below the furcations 22 and 23, can be grasped in either hand and the thumb of such hand applied to the thumb rest 29. The furcation 22 is sufficiently resilient to yieldably move away from the furcation 23 when pressure is applied to the rest 29, to cause the extension or push rod 27 to move from left to right through the opening 28 and thus move the furcation 22 and needle 26 away from the magnifying glass 31. In this manner the lens 32 can be located at the correct focal length from the needle eye 33 to best accommodate the eye of the user for threading the needle 26.

The flared upper ends of the needle recesses 8 and 24 facilitate inserting the pointed end of a needle in either recess.

Various other modifications and changes are contemplated and may be resorted to without departing from the function or scope of the invention.

I claim as my invention:

1. A device for use in threading needles including a holder having a handle for manually supporting the device, said holder having an elongated socket for detachably receiving the pointed end of a needle for supporting the needle eye in an exposed position above the handle, said socket having a flared upper end for guiding the pointed end of the needle into the socket, a magnifying glass supported by the holder with the lens thereof facing the needle eye, and means for varying the spacing between the lens of the magnifying glass and the needle eye for locating the needle eye at the correct focal length of the lens to best accommodate the particular user when threading the needle.

2. A device as in claim 1, said spacing means providing a pivotal mounting for the magnifying glass on the holder for swinging movement toward and away from the needle eye.

3. A device as in claim 1, and means for retaining the magnifying glass in different adjusted positions relative to the needle eye.

4. A device as in claim 1, said holder having a bifurcated portion including a first furcation having said socket for detachably receiving the needle, a second furcation providing a support for the magnifying glass, and means for moving one of said furcations away from the other furcation for varying the spacing between the needle eye and magnifying glass.

5. A device as in claim 4, said last mentioned means comprising a lateral extension of said first furcation, said second furcation having an opening through which said lateral extension loosely extends, said lateral extension forming a push rod and having a thumb rest at the terminal thereof, said first furcation being resilient whereby when pressure is exerted on the thumb rest with the thumb of the hand gripping and supporting the holder said first furcation will move away from the second furcation for increasing the space between the needle eye and the magnifying glass lens.

* * * * *